(12) United States Patent
Kahrger et al.

(10) Patent No.: US 9,469,478 B2
(45) Date of Patent: Oct. 18, 2016

(54) WALL FOR RECEIVING WEAR PLATES AND METHOD FOR REPLACING WEAR PLATES

(71) Applicant: TAKRAF GmbH, Leipzig (DE)

(72) Inventors: Rainer Kahrger, Leipzig (DE); Mario Dilefeld, Leipzig (DE); Carlos Llanos, Leipzig (DE)

(73) Assignee: TAKRAF GmbH, Leipzig (DE)

( * ) Notice: Subject to any disclaimer, the term of this patent is extended or adjusted under 35 U.S.C. 154(b) by 0 days.

(21) Appl. No.: 14/712,246

(22) Filed: May 14, 2015

(65) Prior Publication Data

US 2015/0336742 A1 Nov. 26, 2015

(30) Foreign Application Priority Data

May 21, 2014 (DE) .......................... 10 2014 209 697

(51) Int. Cl.
*B65G 11/16* (2006.01)
*B65G 11/02* (2006.01)
*B65G 11/18* (2006.01)
*B65G 11/20* (2006.01)

(52) U.S. Cl.
CPC ............. *B65G 11/02* (2013.01); *B65G 11/166* (2013.01); *B65G 11/18* (2013.01); *B65G 11/20* (2013.01); *B65G 2201/04* (2013.01); *B65G 2207/48* (2013.01); *Y10T 29/49897* (2015.01)

(58) Field of Classification Search
CPC ..... B65G 11/16; B65G 11/166; B65G 11/18; B65G 11/186
USPC .................. 193/33, 34, 2 R; 52/220.8, 302.1
See application file for complete search history.

(56) References Cited

U.S. PATENT DOCUMENTS

| | | | |
|---|---|---|---|
| 3,883,080 A | 5/1975 | Andersson | |
| 5,055,336 A | 10/1991 | Davis | |
| 5,735,377 A * | 4/1998 | Herren | B65G 11/166 193/33 |
| 6,279,715 B1 | 8/2001 | Herren | |
| 6,591,995 B1 | 7/2003 | Grove | |
| 7,232,023 B2 | 6/2007 | Ellis et al. | |
| 7,527,138 B1 * | 5/2009 | Kemper | B07B 13/16 193/25 FT |
| 8,616,358 B2 * | 12/2013 | Dunn | B65D 88/66 193/25 B |
| 8,919,522 B2 * | 12/2014 | Cieplak | B65G 11/026 193/28 |
| 9,038,803 B2 * | 5/2015 | Dunn | B65D 88/66 193/25 B |
| 9,221,608 B2 * | 12/2015 | Wark | B65G 11/166 |
| 2012/0090953 A1 * | 4/2012 | Cieplak | B65G 11/026 193/2 R |

FOREIGN PATENT DOCUMENTS

| | | |
|---|---|---|
| JP | S51 70872 U | 6/1976 |
| JP | S59 26804 A | 2/1984 |
| JP | H06 65316 U | 9/1994 |

OTHER PUBLICATIONS

European Search Report of Oct. 28, 2015.

* cited by examiner

*Primary Examiner* — William R Harp
(74) *Attorney, Agent, or Firm* — McGlew & Tuttle, P.C.

(57) ABSTRACT

A wall (2), for receiving one or more wear plates (1), has openings for receiving at least some of the fastening elements (11, 12) of the wear plates (1). The wall has, furthermore, gaps (22), with dimensions corresponding to the width and thickness of the wear plates (1). Slots (23) extend from the gaps (22). The slots (23) correspond to the fastening elements (11, 12) of the wear plate (1). The fastening elements (11, 12) of the wear plates (1) can pass through the wall (2), through the slots (23).

12 Claims, 7 Drawing Sheets

WALL FOR RECEIVING WEAR PLATES AND METHOD FOR REPLACING WEAR PLATES

CROSS REFERENCE TO RELATED APPLICATIONS

This application claims the benefit of priority under 35 U.S.C. §119 of German Patent Application DE 10 2014 209 697.9 filed May 21, 2014, the entire contents of which are incorporated herein by reference.

FIELD OF THE INVENTION

The present invention relates to a wall for receiving one or more wear plates, wherein this wall has openings for receiving at least some of the fastening elements of the wear plates.

BACKGROUND OF THE INVENTION

When loading and unloading bulk materials, especially coarse-grained or lumpy bulk materials, the surfaces of the machines that are in contact with these bulk materials are subject to especially intense frictional stress. These surfaces are therefore frequently protected with protective surfaces, so-called wear plates, against the stress.

A plurality of linings of dumping or transportation devices subject to abrasive stress are known from the state of the art.

Thus, U.S. Pat. No. 6,279,715 B1 discloses a mounting system for a chute, which mounting system has a framework carrying the chute, in which individual protective pads are hung. Recesses in the side edges of the wear plates snap in here behind snap-in elements. The wear plates may also be replaced individually. However, they must be pried out of the clamped connection by means of a tire lever for this. However, the edges and snap-in elements may become damaged when dumping in rocky material, which makes easy replacement impossible.

U.S. Pat. No. 5,055,336 A proposes that the bottom of a chute be provided with steel strips laid on edge, between which the wear plates are arranged detachably. The plates are bolted to the bottom of the chute. The bolts are arranged recessed in the wear plates and are covered by inserts, which protect the bolt heads. However, the cover may be expected to become damaged when filling rocky materials.

It is common in all documents mentioned that the wear plates are arranged on supports, from which they can be readily detached and replaced. However, it is remarkable that the interior space of the chutes must be entered when replacing the wear plates in order to bring the wear plates to the point at which they are to be fastened, because the fastening elements are to be loosened from the side of the wear plates. Since it is difficult to access these fastening elements and they may also be destroyed because of the mechanically rubbed-off particles and the contamination of these fastening elements, all the means disclosed for accomplishing the object have a problem in common.

U.S. Pat. No. 7,232,023 B2 is an exception. The wear plates are hung here at their upper edge into a mechanical holding device. Moreover, the wear plates are arranged in the manner of a slated roof, so that the row of plates arranged at a higher level protects the suspensions of the row arranged under it by partially overlapping this. However, it cannot be overlooked that this construction is suitable for lower stresses only, because a row of cavities, where the wear plates do not lie flatly on the support construction, is formed under the wear plates. In addition, despite the coverage by a superjacent row of wear plates, the holding devices are susceptible to mechanical stresses, which may lead to bending of the holding devices.

U.S. Pat. No. 3,883,080 A pertains to an arrangement of wear plates, which is designed as a lining of a surface that is subject to stress. Rubber or a similar substance is provided as the lining material. The lining is effected section by section, and the lining sections are held by self-threading bolts. The self-threading fastener meshes with the lining material. The projecting end of the bolt is passed through the supporting wall and locked with a nut. However, the lining sections obviously cannot be replaced without direct access to the lined surface.

The replacement of the wear plates must be performed from the stressed side in all construction variants according to the state of the art. The risk of material possibly falling from a storage hopper located at a higher level at the time of changing a plate cannot therefore be eliminated by these constructions.

SUMMARY OF THE INVENTION

The present invention pertains to a design for accomplishing an object of the invention for a wall, which makes it possible to replace wear plates that absorb the intensive abrasive stress described reliably, cost-effectively and rapidly without having to enter the interior space of the chutes.

Thus, an object is to provide a wall for receiving wear plates, which makes simple replacement of the wear plates possible. The construction of the areas lined with wear plates is often such that material, especially rocks, may fall from chute areas, storage hoppers or upstream conveyor belts located at a greater height. It shall therefore be possible not to have to enter the lined area in order to repair or replace the wear plates. Another object of the present invention is to provide a method that makes possible the simple and rapid replacement of the wear plates.

According to the invention, a wall is provided for receiving one or more wear plates. The wall has openings for receiving at least some of the fastening elements of the wear plates. The wall openings may be comprised of one or more gaps, with dimensions corresponding to or are greater than the width and thickness of the wear plates. Slots extend from the gaps. The slots correspond to the fastening elements of the wear plate. The fastening elements of the wear plates can pass through the wall, through the slots.

According to another aspect of the invention, a wall arrangement or wall system is provided comprising a plurality of wear plates, and a wall with a wall surface for receiving the wear plates. The wall defines a plurality of fastened wear plate positions comprising a gap opening having dimensions that are greater than or at least correspond to a width and thickness of the wear plates and slots having dimensions corresponding to the fastening elements of the wear plate. The fastening elements of the wear plates pass through the slots and can pass through the wall. The slots originate from the gaps to form a continuous opening.

Wear plates are plate-shaped formations, which have a wear-resistant, often ceramic layer on one side. The wear plates are employed, for example, in material handling for loading and unloading bulk materials, especially in chutes, The wear plates are often rectangular and have fastening means on their reverse side. The fastening means are mostly four threaded bolts or threaded holes for receiving screws.

The fastening of the wear plates is effected, as a rule, by screw connections, but other fastening methods are also possible. For example, clamping wedges, clamps or bolts are preferred in this case.

The wall according to the present invention for mounting the wear plates have various openings. These openings are used to mount and retain the wear plates from the outer side, i.e., the wear plates are passed through the wall for mounting and are then fastened. Additional openings, through which, for example, tight wear plates can be loosened by the action of blows, may optionally be provided in the wall. A gap, which extends at an edge of the position of the wear plate to be mounted, is provided as the opening in the wall for mounting the wear plates. The gap corresponds in terms of width and height to the dimensions of the edge of the wear plate to be mounted there. The gap preferably has a height that makes it possible to tilt the wear plate in the gap into a position in which it is in parallel to the gap. The insertion of the wear plates thus becomes possible in the manner explained below. The height of the gap that is actually necessary can be determined by the person skilled in the art from simple geometric calculations. Two slots, whose position and dimensions correspond to the bolts on the reverse side of the wear plate, extend at right angles from the gap. Openings, through which the bolts of the wear plate can pass to the rear side of the wall, are provided to retain the wear plate. There are openings located far from the gap, which correspond only to the dimensions of the bolts (or are slightly larger than these bolts in order to also make insertion with an inclined bolt possible) as well as openings located close to the gap, which may possibly be identical to the slots or are connected with the gap by an open transition. The fastening means (bolts) provided for the corresponding openings are likewise called bolts located close to the gap and bolts located far from the gap.

The wall may optionally be provided with reinforcing ribs or with a reinforcing grid in order to attain the necessary mechanical stiffness.

In principle, practically any conventional wear plate may be used. The wear plate replacement according to the present invention makes it possible to use larger and hence heavier wear plates, which further simplifies the replacement, because fewer parts are to be handled. The wear plates preferably have a rectangular or square shape. They preferably lie on the wall directly adjacent to one another and thus form a fully or extensively closed protective surface. The wear plates may also have shapes other than a rectangular or hexagonal shape. They are preferably provided over the entire surface in the area of the wall that is to be protected in the manner of a mosaic or a tile surface. The distance between the wear plates is to be minimized taking the structural conditions into account. The edge lengths of the wear plates are preferably selected to be such that maximum chute surfaces are covered and manual handling of the wear plates during the replacement thereof is possible. In a preferred embodiment, the wear plates are square or rectangular. They are preferably arranged in vertical rows, the wear plates of adjacent rows being offset in relation to one another. The offset preferably equals half to two thirds of the height of a mounted wear plate (measured from the lower edge of the mounted wear plate). Since the wall has a gap for each wear plate in the overall width of the wear plate, this offset prevents the gaps for mounting rows of wear plate located next to each other from being likewise located next to each other. This would mean a great structural weakening of the wall, which can be avoided by the described offset.

Provisions are made in another preferred embodiment of the arrangement of square wear plates for the gaps for mounting the wear plates to be in different positions. The positions of the gaps are changed here in case of adjacent wear plates. Thus, a wear plate mount has the gap on the underside of the mounting position, the wear plate mount located adjacent on the left has the gap at the left-hand edge, the wear plate mount located adjacent on the right likewise has this gap at the left-hand edge, and the wear plate mount arranged above it has the gap for mounting, e.g., at the upper edge. The positions of the gaps for the mounting may be varied such the largest possible wall material is preserved without perforations between adjacent wear plates. The stability and the strength of the wall are thus advantageously increased.

The fastening means on the reverse side of the wear plates are preferably bolts, especially preferably threaded bolts, which protrude at right angles from the reverse side and are preferably arranged symmetrically in the corners or in the vicinity of the corner. The threaded bolts preferably consist of the same material as the wear plate. However, other materials compatible with this the wear plate (absence of the formation of corrosion points, ability to be connected) are possible as well. The actual dimensions of the wear plate, the thickness of the wear plate and the dimensions of the bolts depend on the specific requirements and the customer's wishes and can be adapted.

According to another aspect of the invention, a method is provided for mounting wear plates. The method comprises the steps of providing a plurality of wear plates and providing a wall with a wall surface for receiving the wear plates, the wall defining a plurality of fastened wear plate positions comprising a gap opening having dimensions that are greater than or at least correspond to a width and thickness of the wear plates and slots having dimensions corresponding to the fastening elements of the wear plate and through which slots the fastening elements of the wear plates can pass through the wall, the slots originating from the gaps to form a continuous opening.

The method according to the present invention for mounting wear plates on an above-described wall according to the present invention comprises the following process steps.

The mounting of one or more insertion aids on one or more fastening elements located close to the gap is effected in a first step a) after the lock nuts have been removed here. In a simple embodiment, extensions are screwed for this on the threaded bolts located on the wear plate for fastening. Fastening elements located close to the gap are those that are arranged in the gap or in one of the slots in the mounted state.

The insertion of the wear plate into the gap until the fastening elements that are not located close to the gap have passed through the slots is effected in the next step b). The insertion is consequently effected first with the fastening elements that have no insertion aids.

The wear plate is subsequently tilted in the gap in step c) such that the fastening elements located close to the gap enter the slots and the wear plate can be passed completely through the wall. The fastening elements located far from the gap are thus led to their fastening points in the wall.

The insertion of the fastening elements that are not located close to the gap into the openings of the wall that are intended for this purpose is then effected in step d).

Locking of the fastening elements that are located close to the gap in the openings and detachment of the insertion aids from the fastening elements located close to the gap are effected in a final step e). Threaded bolts are preferably used as fastening elements and the locking is preferably performed by means of nuts that are to be screwed on.

The fastening elements located close to the gap are likewise locked in the subsequent, optional step f).

The locking of the fastening elements in steps e) and f) is preferably effected by fastening nuts on threaded bolts. Washers are especially preferably used additionally in order to guarantee good contact of the nuts. Washers that cover the gap width and the slot width are especially advantageous for fastening the fastening elements located close to the gap.

When mounting the wear plate, these are tilted, preferably until they form right angles with the wall at least approximately. They are then passed for the most part through the gap in the wall and through the wall. The bolts on the reverse side of the wear plate now pass through the slots. The wear plate is inserted entirely into the gap by slightly tilting the wear plate at an acute angle in relation to the wall. The wear plate is held now on the bolts located closest to the gap from the outer side of the wall, while the bolts located far from the gap are inserted into the openings intended for them. The wear plate is then tilted entirely into the mounted position and fastened in its position from the outer side of the wall.

In an especially preferred embodiment, insertion aids are fastened to one or more of the bolts located closest to the gap. These are preferably extensions of the bolts, which are screwed onto same or are otherwise detachably fastened. The insertion aids can be removed after insertion of the bolts located far from the gap into the openings intended for them. The insertion aids act as mounting aids and their shape can be correspondingly adapted. In an especially simple embodiment, they are simple screwed-on bars. Advanced embodiments provide for curved insertion aids and insertion aids provided handling aids (for example, handles).

The wall according to the present invention makes it possible, for the first time ever, to change the wear plates located on the inner side of the wall from the outer side of the wall. The personnel does not consequently have to enter the device and is protected from falling bulk material.

An exemplary embodiment of the present invention will be explained below on the basis of figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF AN EXEMPLARY EMBODIMENT

Figure 1:
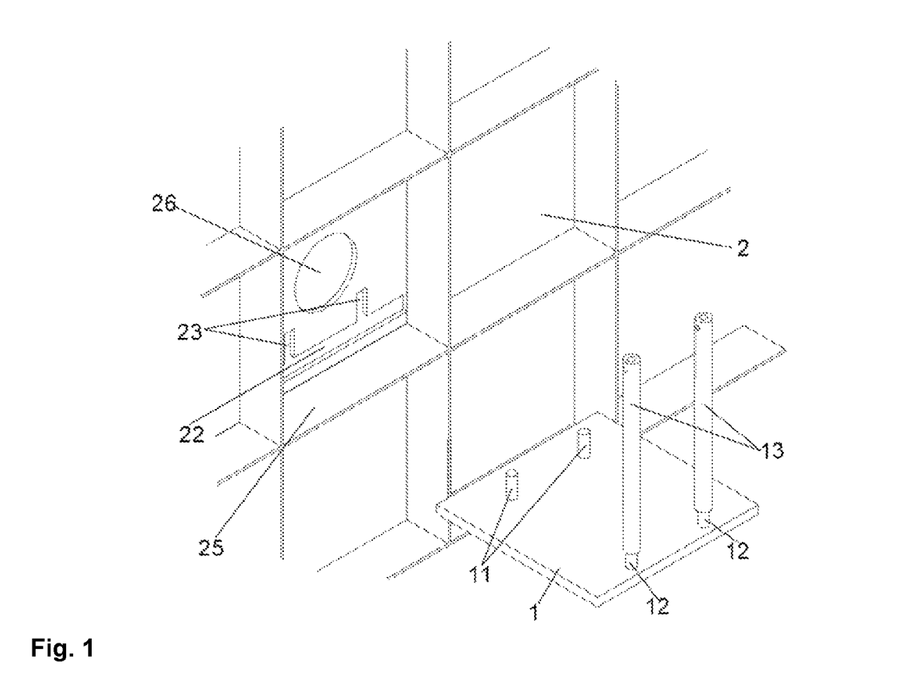
FIG. 1 is a perspective view showing the mounting of the wear plate (1) according to the present invention in the wall (2) in one of different stages of progression.
Figure 2:
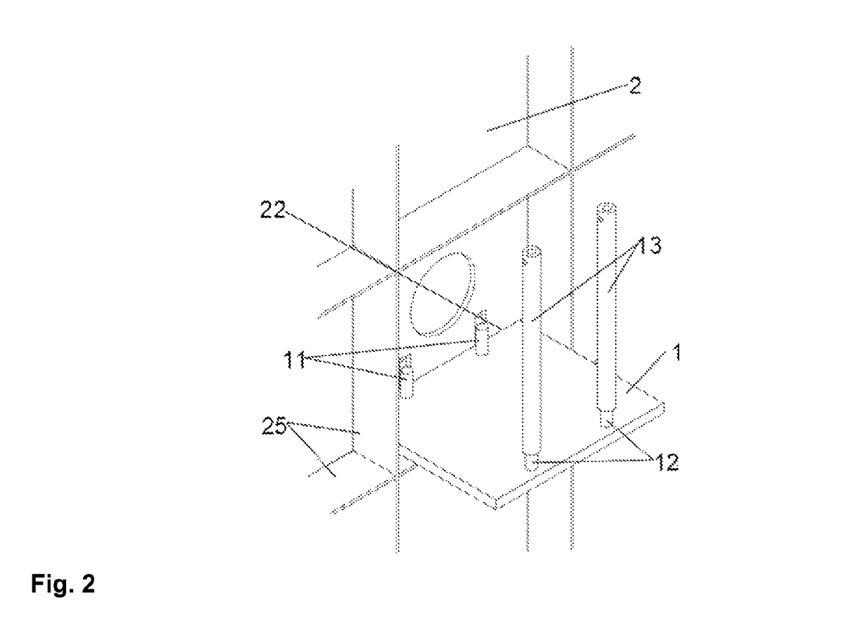
FIG. 2 is a perspective view showing the mounting of the wear plate (1) according to the present invention in the wall (2) in one of different stages of progression.

Referring to the drawings, FIG. 1 shows a wear plate (1). The wear plate (1) is square (edge length 30 cm). FIG. 2 shows the wear plate tilted horizontally and the fastening elements (11) located far from the gap in the front, inserted into the gap (22). The fastening elements (11) located far from the gap now pass through the slots (23) intended for them.

Figure 3:
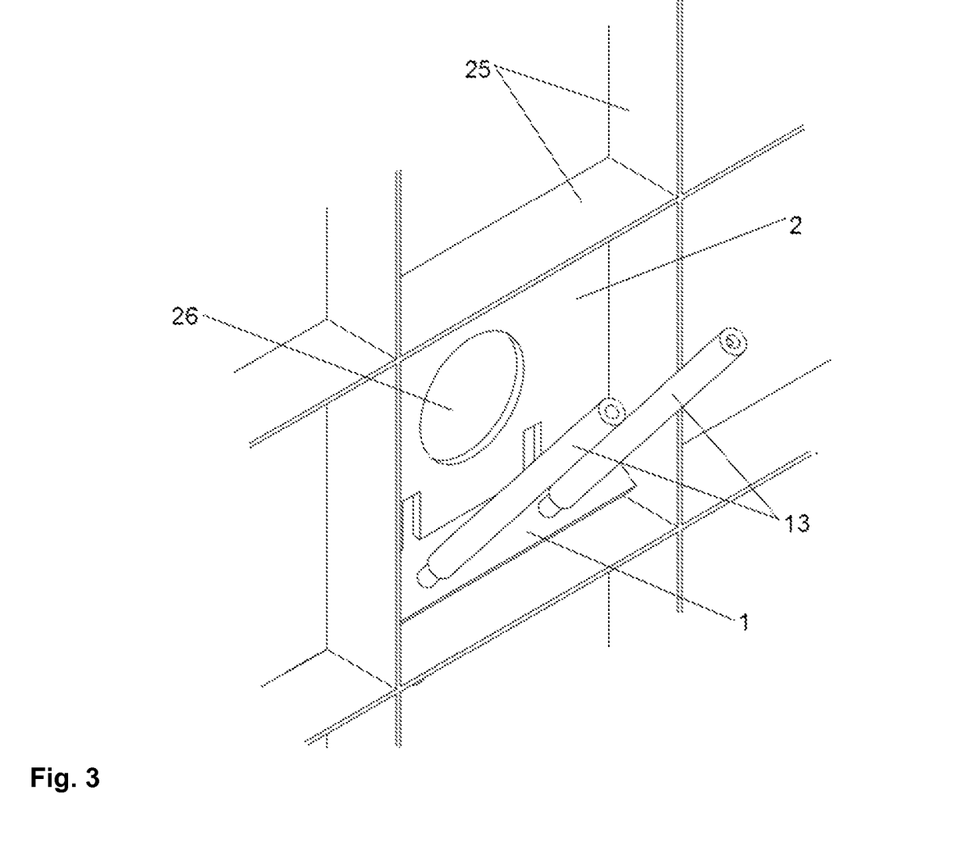
FIG. 3 is a perspective view showing the mounting of the wear plate (1) according to the present invention in the wall (2) in one of different stages of progression.

In FIG. 3, the fastening elements (11) have already passed through the slots (23) and the wear plate (1) is tilted now in the gap (22) and using the insertion ids (13), which are passed farther through the gap (22), and the fastening elements (12) located close to the gap are inserted into the slots (22) and the fastening elements (11) located far from the gap (not shown here) are inserted into the openings for mounting the fastening elements located far from the gap. An additional round opening (26), through which a tight wear plate (1) can be loosened by means of blows with a hammer, is provided centrally to the fastening position of the wear plates (1). In addition, the opening (26) makes it possible to measure the thickness of the wear plates (1) in the installed state and thus to determine the state of wear.

Figure 4:
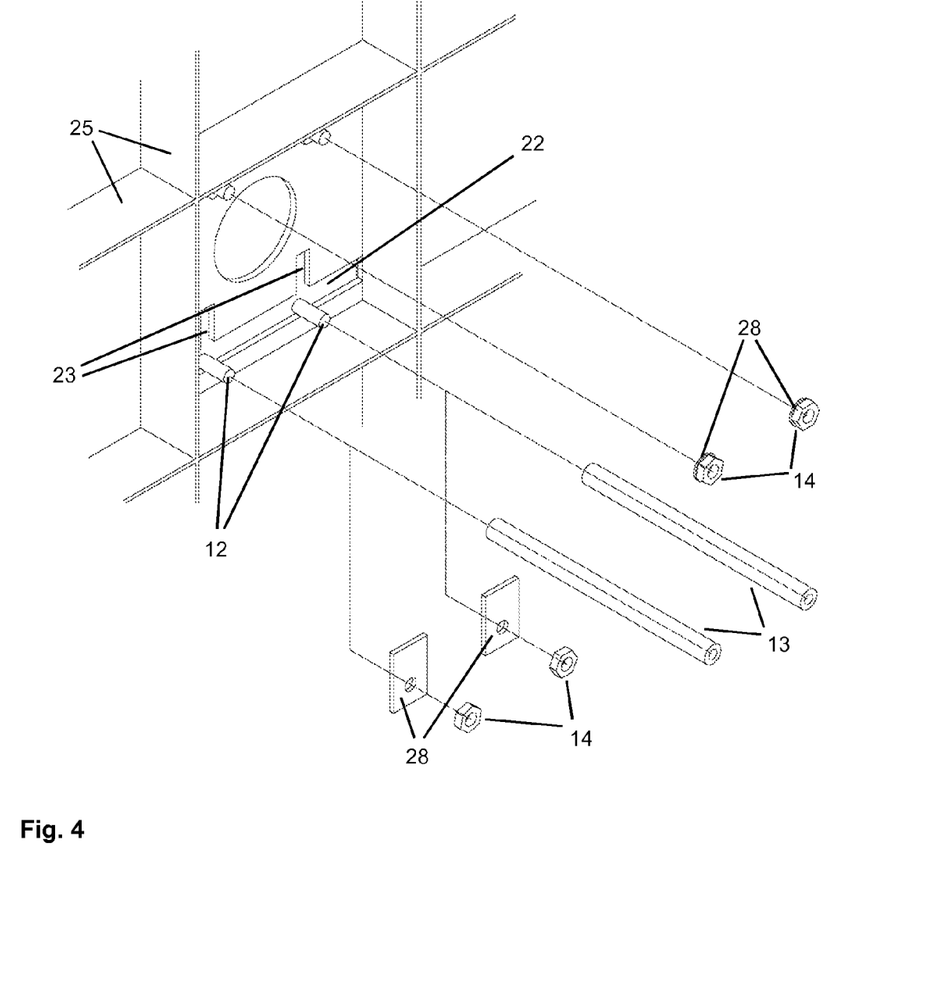
FIG. 4 is a perspective view showing the mounting of the wear plate (1) according to the present invention in the wall (2) in one of different stages of progression.
Figure 5:
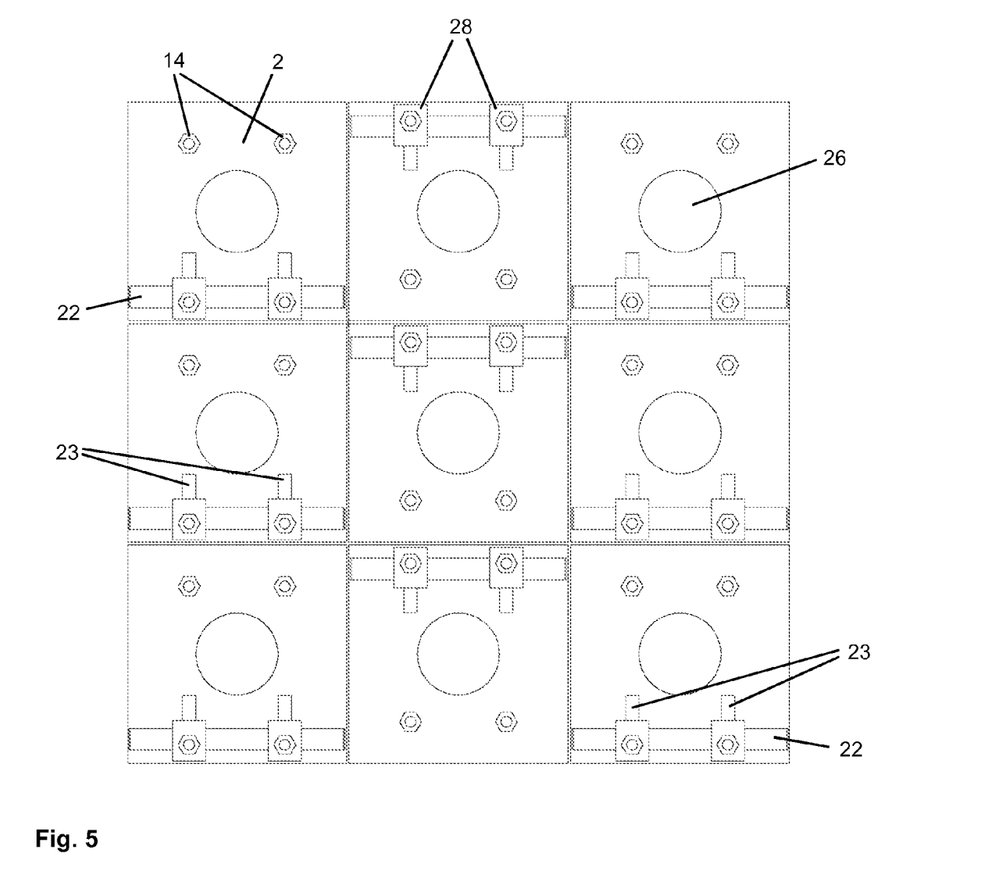
FIG. 5 is a view showing different possibilities of arranging the gaps (22) for mounting in the wall (2) such that they do not form long rows of gaps (2), which would lead to a structural weakening of the wall (2)
Figure 6:
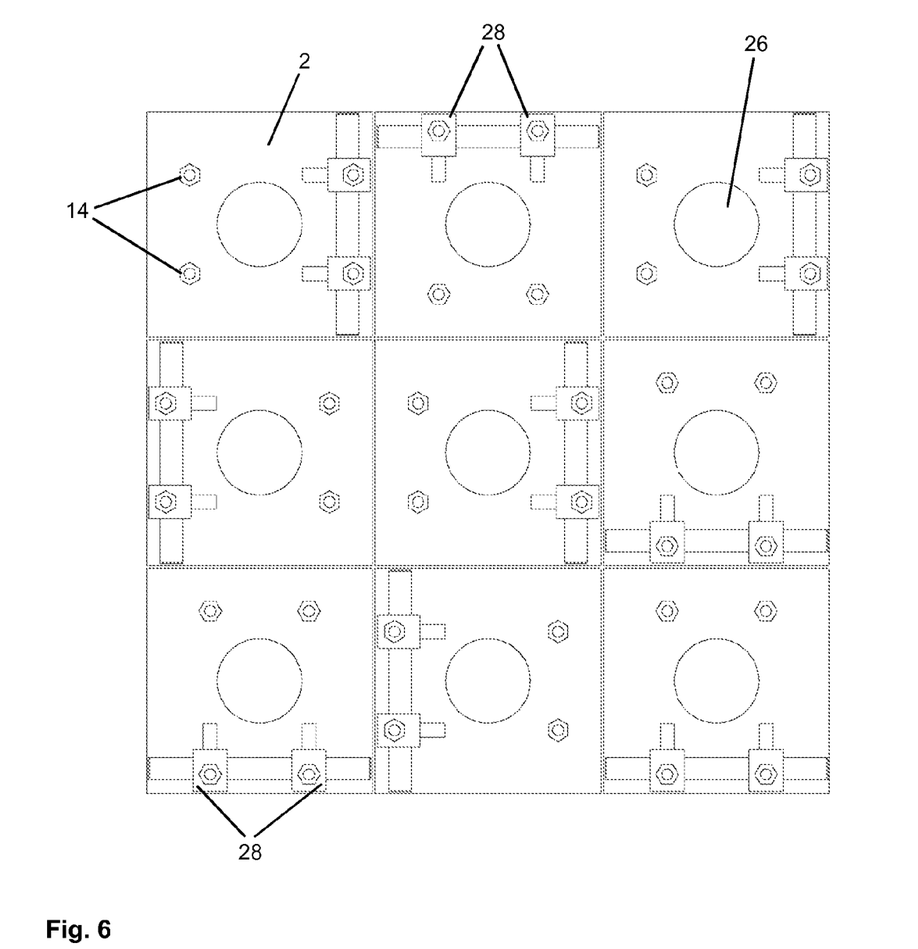
FIG. 6 is a view showing further different possibilities of arranging the gaps (22) for mounting in the wall (2) such that they do not form long rows of gaps (2), which would lead to a structural weakening of the wall (2)
Figure 7:
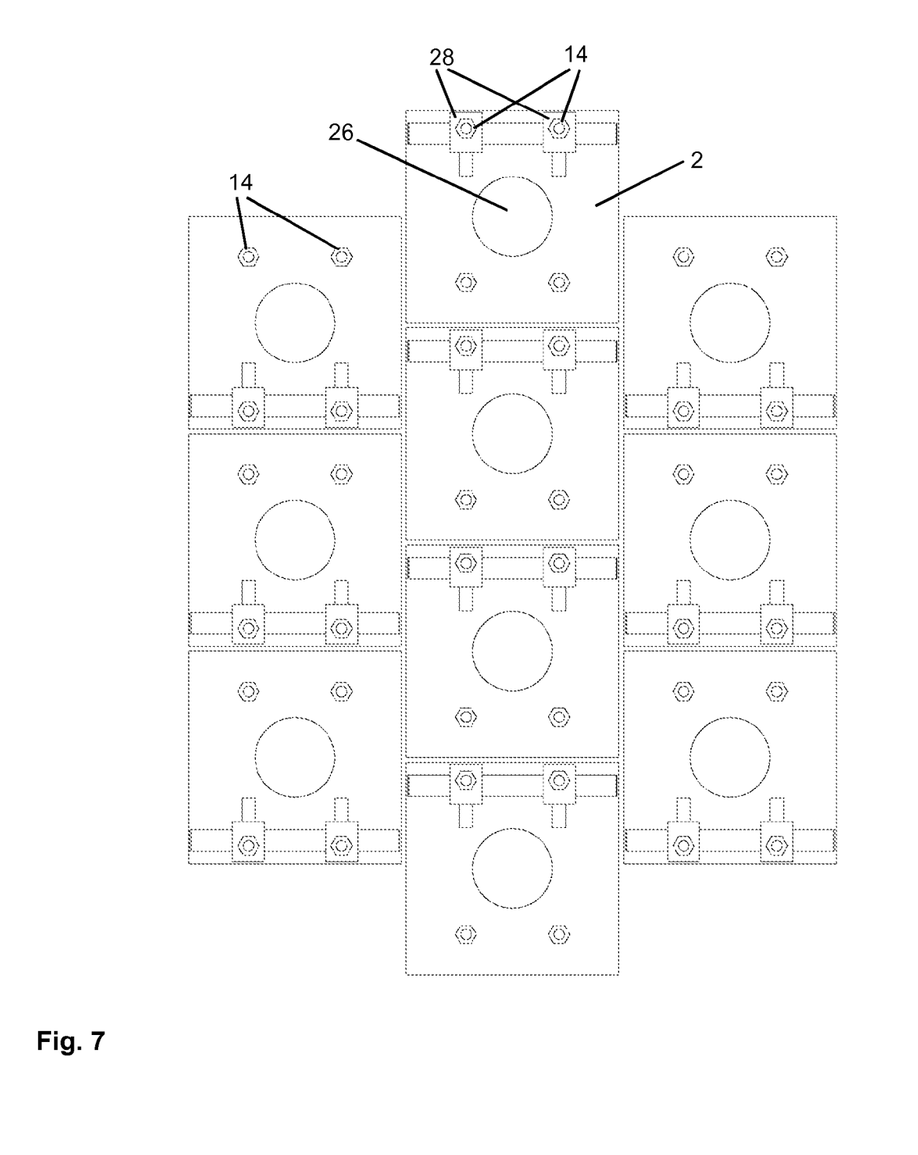
FIG. 7 is a schematic view showing how gaps (22) can be advantageously prevented from being located next to each other by an offset by about half the length of the wear plates (1) and the reversed arrangement of the wear plates (1) in the middle row, so that the stability of the wall (2) is preserved.
Figure 8:
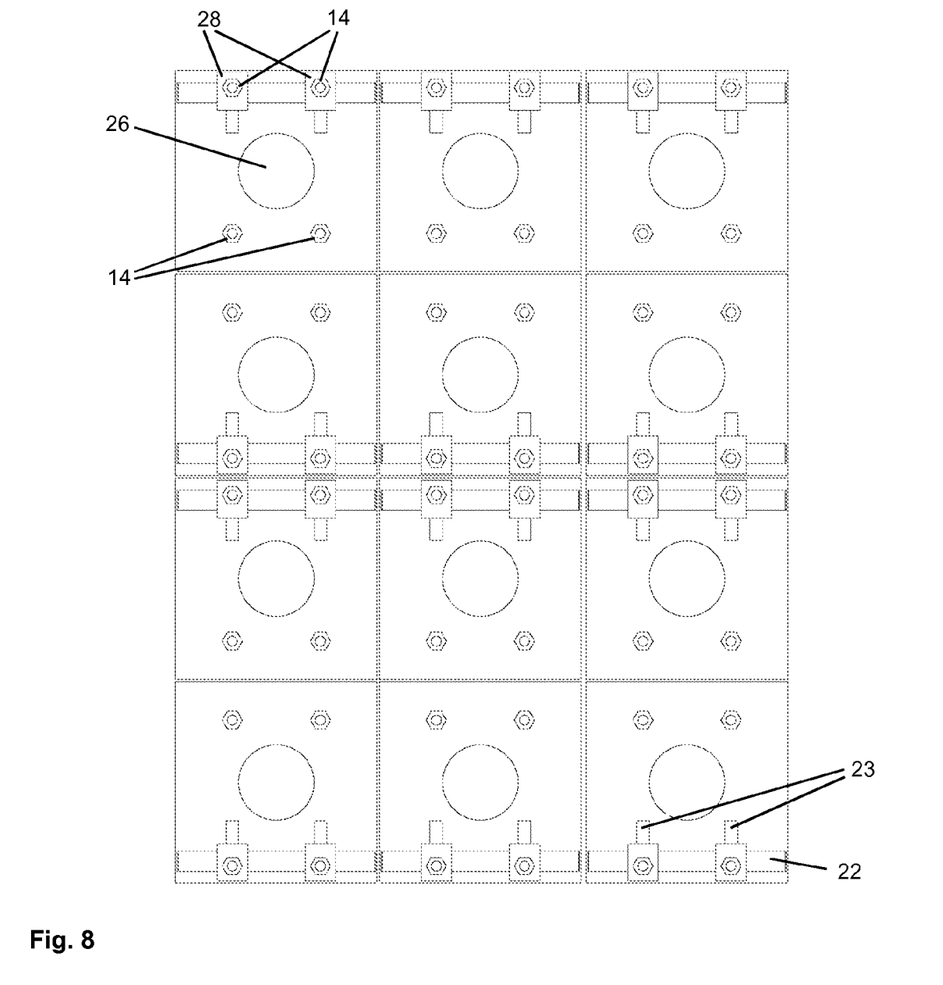
FIG. 8 is a view showing a homogeneous arrangement of the wear plates (1), wherein a reinforcing element is arranged in the middle area of the gaps (22) located adjacent to one another, which compensates the local weakening of the wall (2).

The wear plate (1) has reached its mounted position in FIG. 4. The fastening elements (11) located far from the gap are locked in the openings for receiving the fastening elements located far from the gap by means of the nuts (14) and washers (28). The insertion aids (13) are unscrewed from the fastening elements (12) located close to the gap. The washers (28) in the area of the slot (23) and gap (22) are made with large surfaces to cover the gap (22) and the slot (23) and to guarantee secure retention.

While specific embodiments of the invention have been shown and described in detail to illustrate the application of the principles of the invention, it will be understood that the invention may be embodied otherwise without departing from such principles.

What is claimed is:

1. A wall for receiving one or more wear plates, the wall comprising:
    one or more gaps having dimensions that are greater than or at least correspond to a width and thickness of the wear plates; and
    slots having dimensions corresponding to the fastening elements of the wear plates and through which slots the fastening elements of the wear plates can pass through the wall, the slots originating from the one or more gaps to form a continuous opening.

2. A wall in accordance with claim 1, wherein the gaps have a dimension that is greater than the thickness of the wear plates, whereby a tilting of the wear plates in the gaps, that is sufficient for inserting the wear plates, is possible.

3. A wall in accordance with claim 1, further comprising a plurality of wear plates, and a corresponding plurality of gaps and slots, wherein the gaps are for mounting the wear plates that are horizontally or vertically adjacent to one another and the gaps are not arranged directly adjacent to one another.

4. A wall in accordance with claim 3, further comprising additional openings, each of the additional openings being located centrally relative to a position of a fastened wear plate.

5. A wall in accordance with claim 3, further comprising reinforcing ribs or a reinforcing grid.

6. A wall arrangement comprising:
   a plurality of wear plates a wall surface for receiving the wear plates, the wall defining a plurality of fastened wear plate positions comprising:
      a gap having dimensions that are greater than or at least correspond to a width and thickness of the wear plates; and
      slots having dimensions corresponding to the fastening elements of the wear plate and through which slots the fastening elements of the wear plates can pass through the wall, the slots originating from the gaps to form a continuous opening.

7. A wall arrangement in accordance with claim 6, wherein the gaps have a dimension that is greater than the thickness of the wear plates, whereby a tilting of the wear plates in the gaps, that is sufficient for inserting the wear plates, is possible.

8. A wall arrangement in accordance with claim 6, wherein the gaps are for mounting the wear plates that are horizontally or vertically adjacent to one another and the gaps are not arranged directly adjacent to one another.

9. A wall arrangement in accordance with claim 6, further comprising additional openings, each of the additional openings being located centrally relative to each fastened wear plate position.

10. A wall arrangement in accordance with claim 6, further comprising reinforcing elements in areas in which there is an increased number of gaps.

11. A method for mounting wear plates, the method comprising the steps of:
   providing a plurality of wear plates;
   providing a wall with a wall surface for receiving the wear plates, the wall defining a plurality of fastened wear plate positions comprising:
      a gap having dimensions that are greater than or at least correspond to a width and thickness of the wear plates; and
      slots having dimensions corresponding to the fastening elements of the wear plate and through which slots the fastening elements of the wear plates can pass through the wall, the slots originating from the gaps to form a continuous opening;
   mounting one or more insertion aids on one or more fastening elements located close to the gap, wherein the fastening elements located close to a gap are arranged in the gap or in one of the slots in a mounted state of the wear plate;
   inserting the wear plate into one of the gaps until the fastening elements that are not close to a gap have passed through the slots;
   tilting the wear plate in the gap such that the fastening elements that are located close to the gap will enter the slots and the wear plate can be passed entirely through the wall; and
   inserting the fastening elements that are not close to a gap into the openings provided for the fastening elements in the wall; and
   locking the fastening elements that are not close to a gap in the openings and detaching the insertion aids from the fastening elements located close to a gap.

12. A method in accordance with claim 11, wherein the fastening elements located close to a gap are locked after detaching the insertion aids from said fastening elements located close to a gap.

* * * * *